Figure 1:
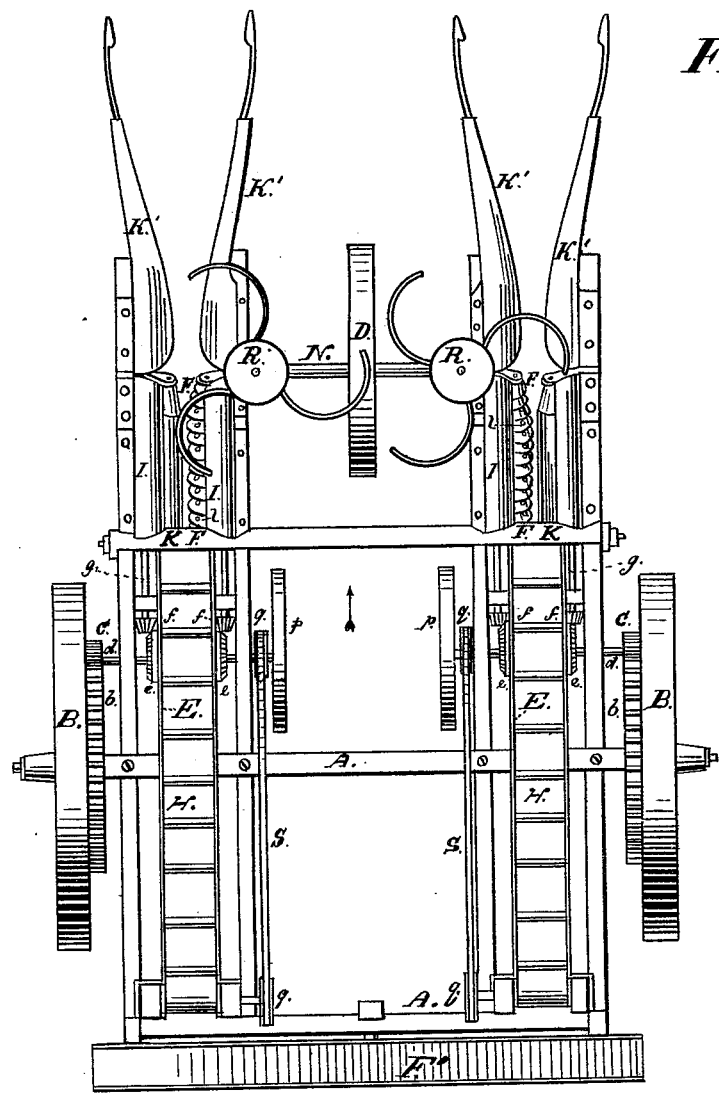

2 Sheets—Sheet 1.

W. H. & J. L. COX.
CORN-HARVESTER.

No. 189,430. Patented April 10, 1877.

WITNESSES:
Geo. W. Sanborn
Thos. H. Bowes

INVENTORS:
Wm. Henry Cox
Joseph Lane Cox
per Jas. B. Erwin & Co
Attorneys.

N. PETERS, PHOTO-LITHOGRAPHER, WASHINGTON, D. C.

W. H. & J. L. COX.
CORN-HARVESTER.
No. 189,430.
2 Sheets—Sheet 2.
Patented April 10, 1877.
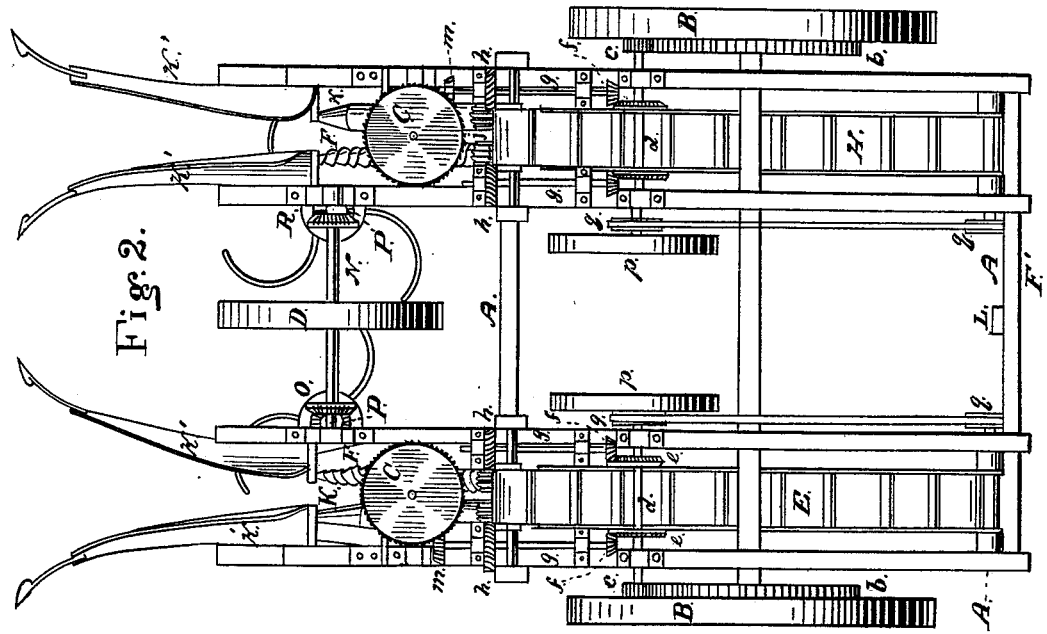
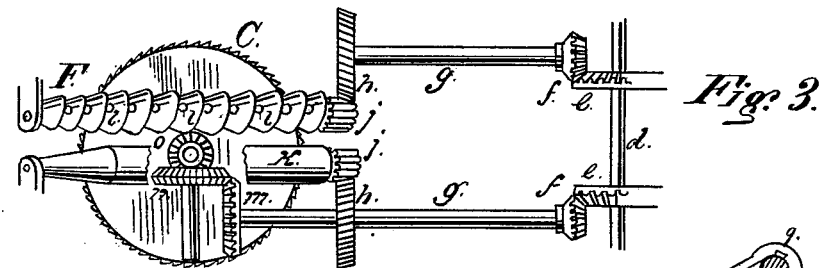
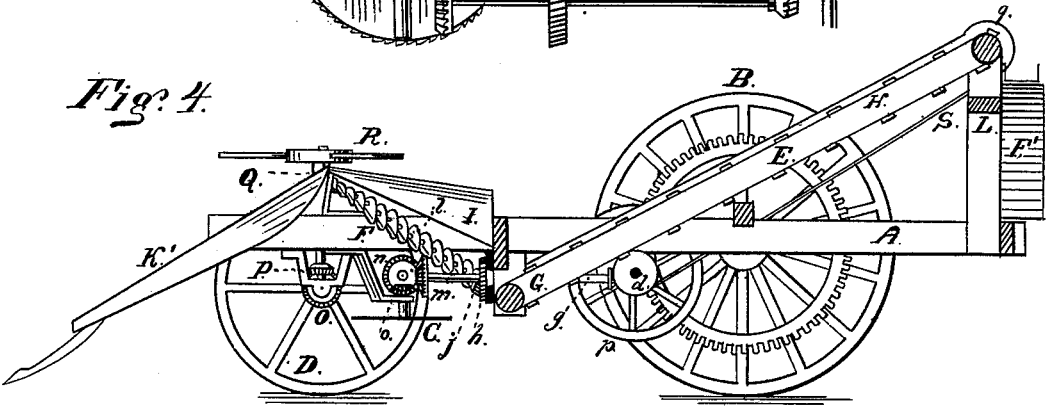
WITNESSES:
Geo. W. Sanborn
Thos. H. Bowes
INVENTORS:
Wm Henry Cox
Joseph Lane Cox
per Jas. B. Erwin & Co
Attorneys

UNITED STATES PATENT OFFICE.

WILLIAM H. COX AND JOSEPH L. COX, OF MILWAUKEE, WISCONSIN.

IMPROVEMENT IN CORN-HARVESTERS.

Specification forming part of Letters Patent No. 189,130, dated April 10, 1877; application filed March 24, 1876.

*To all whom it may concern:*

Be it known that we, WILLIAM H. COX and JOSEPH L. COX, of the city of Milwaukee, in the county of Milwaukee and State of Wisconsin, have invented certain new and useful Improvements in Combined Corn Cutters and Huskers; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Our invention relates to that class of implements which are used for gathering and husking corn in the field, commonly known as "corn-harvesters;" and our invention consists in certain new and improved devices and combination of devices whereby the operation of pulling the corn from the stalks and removing the husk or shuck from the ear is accomplished with greater certainty and with less injury to the grain, all as hereinafter more fully set forth.

Figure 1 in the accompanying drawings represents a top elevation of our invention. Fig. 2 represents a bottom elevation of our invention. Fig. 3 represents a partial view of gearing of rollers. Fig. 4 represents a side elevation of the same.

Similar letters of reference indicate corresponding parts.

A represents the frame of the machine, and is made of any strong and durable material suitable for the purpose. B B represent the driving-wheels of the machine, upon which the frame A is supported. $b\ b$ are spur-wheels, which are either cast upon or securely bolted to the drive-wheels B B. $c\ c$ are pinion-wheels, which have a lateral movement upon the axle or shaft $d\ d$, and are, at the pleasure of the operator, thrown in or out of gear with the spur-wheels $b\ b$. The pinions $c\ c$ are attached to the shaft $d\ d$, and communicate motion to it. $e\ e\ e\ e$ are beveled gear-pinions attached to the shafts $d\ d$. The pinions $e\ e\ e\ e$ are geared with the pinions $f\ f\ f\ f$, which are attached to the shafts or axles $g\ g\ g\ g$. The diagonal toothed pinions $h\ h\ h\ h$ are securely attached to the shafts $g\ g\ g\ g$, and are geared with and communicate motion to the pinions $j\ j\ j\ j$, thereby causing the husking-rollers F F and K K to revolve rapidly. The rollers F F have on their surface spiral-shaped flanges extending from one end to the other, between which flanges are a series of short metallic pins, $l\ l$, the object of which, in connection with the spiral-shaped flanges, is to tear the husks from the corn. $m\ m$ are pinions attached to the shafts $g\ g\ g\ g$, and are geared with the pinions $n\ n$. The pinions $n\ n$ are geared with the pinions $o\ o$. The pinions $o\ o$ are attached to the axle of the serrated circular knives C C, and cause the knives C C to revolve rapidly against the standing corn as the machine is drawn forward. $p\ p$ are balance-wheels, and are attached to the shafts $d\ d$. $q\ q\ q\ q$ are pulley-wheels, which are attached to the shafts $d\ d$, upon which the drive-belts $s\ s$ are run. D is a drive-wheel, which also supports the front end of the machine. It is securely attached to the axle or shaft N. O O are beveled gear-pinions attached to the axle N, and are geared with the pinions P P, thereby communicating motion to the stud Q. R is a reel mounted upon the stud Q, and revolves with it in such manner that its arms strike against the standing corn and crowd it back upon the machine simultaneously with its being cut. E E are elevators which convey the husked corn to and deposit it in the corn-conductor F', and it is thence conveyed into a wagon or other receptacle for the purpose. The conductor F' is attached to the frame A at its center by bolt L in such a manner that as one end is raised the other is lowered, by which arrangement it is made to deposit the corn on either side, as desired. G is a pulley or friction-roller at the lower end of the elevator-belt H. The elevator-belt H is made of metallic chain or any other suitable belting material. I I I are caps or covers attached to the frame A for the purpose of guiding the corn to and between the husking-rollers. $k'\ k'\ k'\ k'$ are gathering-arms, which are adjusted to run near the ground, to gather up the leaning corn preparatory to its being cut.

A driver's seat may be attached to the machine between the elevators H H. There may also be attached thills or a pole, as required.

The machine is drawn by one or more horses, as required, according to the condition of the soil or heft of the corn to be cut.

The operation is as follows: The machine is moved forward in the direction of the arrow, Fig. 1, and operates on two rows of the growing corn at once. The corn passes in between the gathering-arms k', which guide the stalks toward the husking-rollers. The reels R raise the stalks and hold them securely against the rollers while the circular saw C severs them. At the same time the husking-rollers, revolving inwardly or toward each other, pull the stalk down between them, nip off the ears therefrom, and, through the operation of the spirals, flanges, and pins, strip the husk from the ear, leaving the latter free to move along onto the elevators E, which raise it and deposit it in wagons, or into whatever receptacle may be adapted to or found most convenient for the purpose.

It will be seen that the most delicate part of the operation is the severing of the ear from the stalk, and the stripping off the husk, and therein lies our improvement. The pins l on the flanges of the rollers materially aid in quickly removing the husk or shuck, and the cutting of the corn-stalk by the circular saws at the right moment prevents all unnecessary drag on the machine, which might otherwise operate to drag the stalks out by the roots.

We claim as our invention—

1. The spirally-flanged rollers F, having pins l between the flanges, constructed and operating substantially as and for the purpose specified.

2. The combination of the spirally-flanged stripping and husking rollers F, having pins between the flanges, with rollers K, and rotary serrated knives or cutters O, operating simultaneously to cut the corn-stalks, strips them, and husk the ears, substantially as set forth and described.

In testimony that we claim the foregoing as our own we affix our signature in presence of two witnesses.

WM. H. COX.
JOSEPH L. COX.

Witnesses:
  J. V. V. PLATTO,
  GEO. W. SANBORN.